United States Patent

Yajima et al.

Patent Number: 5,144,867
Date of Patent: Sep. 8, 1992

[54] METHOD OF MAKING A CHAIN SAW GUIDE BAR

[75] Inventors: Shoji Yajima; Kazuo Harada, both of Tokyo, Japan

[73] Assignee: Kioritz Corporation, Tokyo, Japan

[21] Appl. No.: 751,075

[22] Filed: Aug. 28, 1991

[30] Foreign Application Priority Data

Sep. 12, 1990 [JP] Japan .................................. 2-241481

[51] Int. Cl.$^5$ ............................................... B23D 63/00
[52] U.S. Cl. .......................................... 76/112; 30/387
[58] Field of Search ................... 76/112, 101.1, 25.1; 30/383, 387

[56] References Cited

U.S. PATENT DOCUMENTS

| | | | |
|---|---|---|---|
| 2,897,856 | 8/1959 | Carlton . | |
| 2,962,812 | 12/1960 | Gommel | 30/383 |
| 3,119,418 | 1/1964 | Rayniak . | |
| 3,241,228 | 3/1966 | Rayniak et al. | 76/112 |
| 3,744,363 | 7/1973 | Espana et al. | 30/383 |
| 3,858,321 | 1/1975 | Conaty | 30/383 |
| 3,987,543 | 10/1976 | Ratz et al. | 30/383 |
| 4,768,289 | 9/1988 | Apfel et al. | 76/25.1 |

Primary Examiner—Roscoe V. Parker
Attorney, Agent, or Firm—Bauer & Schaffer

[57] ABSTRACT

A guide bar for a chain saw is preincised so as to form the tip for the chain. The preincised guide bar is placed in a mold having a recess conforming to the curved tip. The space formed by the recess is then filled with a powdery wear-proof material, which is heated and melted so as to weld with the guide bar.

2 Claims, 5 Drawing Sheets

METHOD OF MAKING A CHAIN SAW GUIDE BAR

FIELD OF THE INVENTION

This invention relates to a method of making a saw chain guide bar adapted to be fit to a chain saw for use in cutting trees and lumbers. More particularly, the present invention is directed to a method of welding a wear-proof member to the curved tip of the chain saw guide bar.

BACKGROUND OF THE INVENTION

As shown in FIG. 7, a chain saw, generally depicted by the numeral 1, comprises a body 2 housing an internal combustion engine or the like, which drives a chain saw 3 over the peripheral edge of a guide bar 4. The guide bar 4 is formed of both right and left outer plates 5,5 and a middle plate 6 integrally joined together by copper brazing or spot welding as shown in FIG. 8 or as seen in FIG. 9 is formed of a steel plate provided on the outer peripheral end edge with a guide groove 7 in which the saw chain 3 is guided so as not to be disengaged.

Normally, the curved part 4a at the tip of the guide bar 4 is subject to most wear as it is the contact part of the guide bar 4, which has the greatest friction with the saw chain 3 due to the tension of the saw chain 3. Therefore, the wear and heat generation by the guide bar 4 and saw chain 3 at the curved tip 4a is so remarkable that the guide bar 4 and saw chain 3 are easily damaged and likely to cause a grave accident, threatening the life of the user.

Heretofore, in order to reduce the wear between the curved tip 4a and the saw chain 3 as much as possible a wear-proof member formed of a material such as "Stellite" has been welded to the guide bar 4 on the curved tip 4a at the tip.

However, when such wear-proof member is to be added to the tip of guide bar 4a, a special skill in the welding technique or the like is required, and a finishing operation as by a mechanical working or grinding is required to remove the unnecessary welded thickness, causing the welding operation to become troublesome.

An object of the present invention is to provide a method for making a chain saw guide bar wherein the work of welding a wear-proof member to the curved tip can be very easily made.

Another object of the present invention is to provide a method for making a chain saw guide bar wherein the finishing operation such as a mechanical working or grinding after the welding operation is not required, and the amount of material needed for the wear-proof member is reduced. As a result, the cost of fabricating the chain guide can be greatly reduced.

SUMMARY OF THE INVENTION

According to the present invention, a guide bar which has been incised in advance to be of a proper width at the curved tip is mated in a mold in which a recess mating the guide bar on the curved part at the tip is formed and a spaced produced between the guide bar and the mold in the recess is filled with a powdery wear-proof member which is heated and melted to be welded to the guide bar at the tip to form the above-mentioned curved part at the tip.

That is to say, a guide bar is incised to be of a proper width on the curved part at the tip, a space is provided between the guide bar and a mold in a recess and is filled with a powdery wear-proof member which is heated and melted so as to be welded in a uniform shape to the guide bar in the curved part at the tip.

As a result, according to the present invention, as compared with the thickness addition by welding of the conventional "Stellite" or the like, the consumption of the material will be smaller, the cost will be much lower, the welding operation will be much simpler and such special skill as of a welding technique will not be required.

Further, when the welding operation ends, there will be substantially no unnecessary addition of the thickness in the welded part, therefore such finishing operation as by a mechanical work or grinding work will be eliminated, and a uniform finished shape will be able to be obtained.

BRIEF DESCRIPTION OF THE DRAWINGS

The drawings show embodiments of the present invention.

In the drawings.

DETAILED DESCRIPTION OF THE INVENTION

The embodiments of the present invention shall be described in detail in the following with reference to the drawings.

Figure 1:
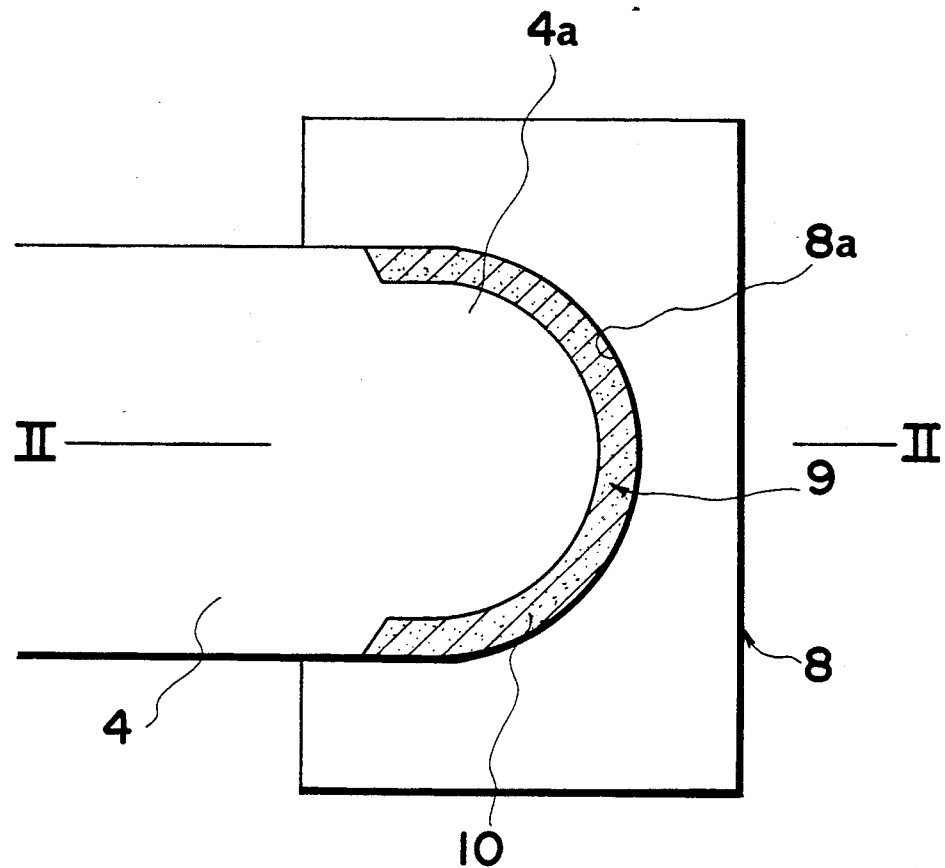
FIG. 1 is a plan view showing a first embodiment.
Figure 2:
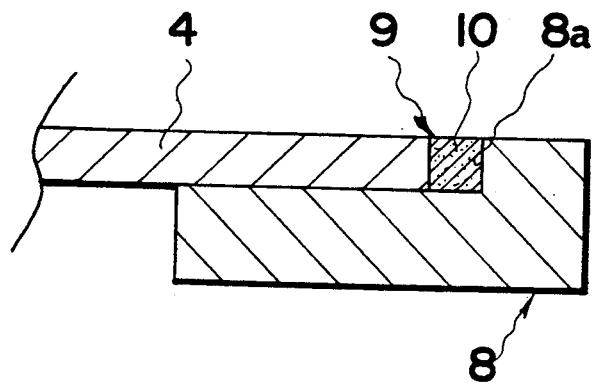
FIG. 2 is a sectioned view on line II—II in FIG. 1.

FIGS. 1 and 2 show the first embodiment of the method of the present invention of welding a wear-proof member to the tip of a chain saw guide bar.

In this embodiment a guide bar 4 made of a single steel plate is cut to a proper width and is provided at its curved tip 4a with a predetermined set-back for the permanent attachment thereof of a wear-proof member 10.

The incised plate forming the guide bar 4 is inserted at its tip in a mold 8 having, on the upper surface, a recess 8a formed to fit the guide bar 4. The guide bar is placed flat in the mold so that its curved tip 4a creates a space 9 between the guide bar 4 and the recess wall 8a. The mold is made of a material such as carbon low in thermal conductivity. The space 9 is filled with a powdery wear-proof member 10 formed of a heat bonding material which, when heated to a liquid phase producing temperature, is melted so as to be sintered and molded in situ to the shape of the space 9. The wear-proof member 10 and the tip of the guide bar 4a become mutually bonded together, and the wear-proof member 10 becomes welded in a uniform shape.

When the above operations end, a saw chain guide groove 7 is formed by conventionally working the outer peripheral edge of the guide bar 4 and the wear-proof member 10 so as to obtain a complete guide bar having a wear-proof tip secured accutately and positively to it.

Therefore, a high degree of skill in the welding technique or the like is not required, and, as compared with a welded thickness added by using the conventional "Stellite" or the like, the consumption of the material will be so low as to be ¼ to ⅕. Further, as there is substantially no unnecessary additional thickness in the wear-proof member 10, and such finishing operation as by a mechanical working or grinding will not be required.

Figure 3:
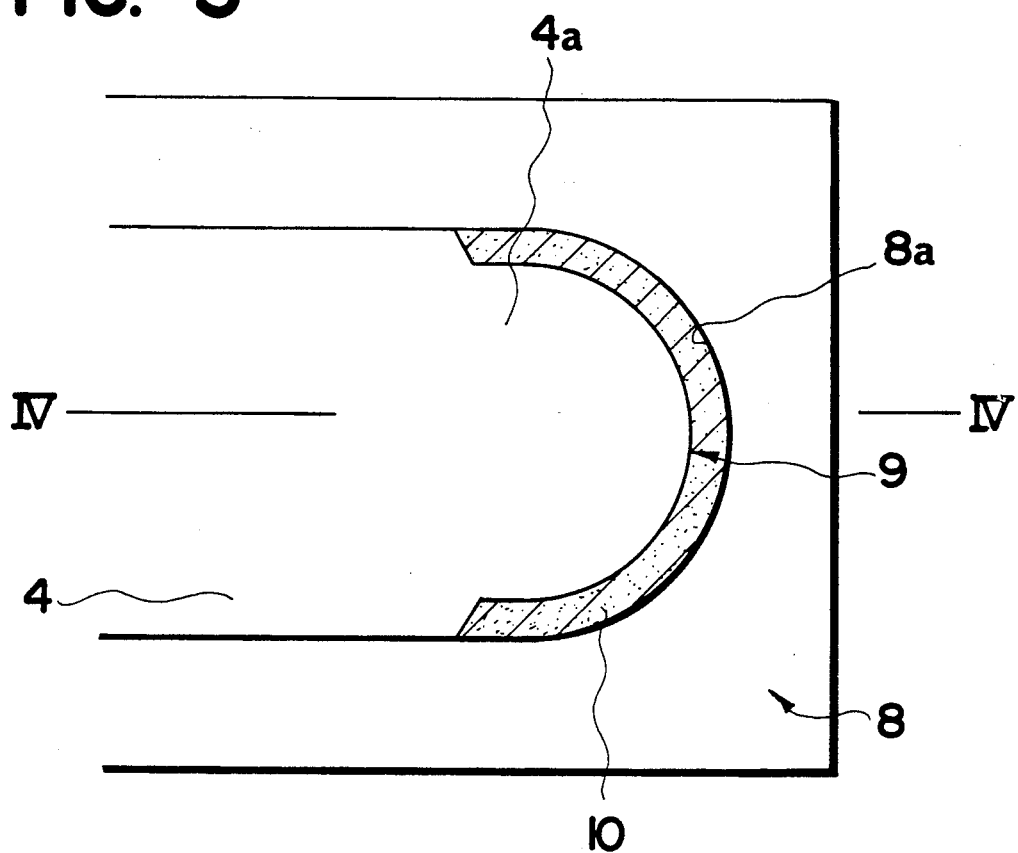
FIG. 3 is a plan view showing a second embodiment.
Figure 4:
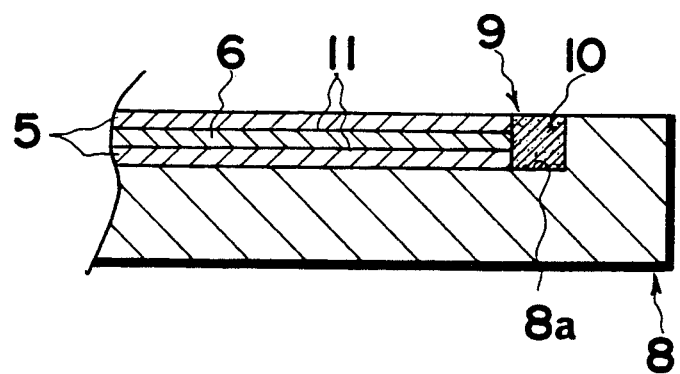
FIG. 4 is a sectioned view on line IV—IV in FIG. 3.

FIGS. 3 and 4 show the second embodiment of the welding method of the present invention.

In this embodiment, a wear-proof member 10 is welded to the curved tip 4a of the guide bar 4. The member is formed of a lamination of three members consisting of a middle plate 6 and right and left outer plates 5,5. Copper foils 11 are sandwiched between the middle plate 6 and each of the outer plates 5 and are mutually diffused so as to be integrally bonded thereto in a copper brazing furnace.

Thereafter, the guide bar 4 incised at its tip 4a to be of a proper width is inserted in the mold 8 provided with the recess 8a. The mold is also made of a proper material low in thermal conductivity The space 9 produced between the mold 8 and guide bar 4 is filled with the powdery wear-proof member 10, which is heated at the same time to a liquid phase producing temperature so that its melts and is sintered and molded to conform to the shape of the recess 8a. The wear-proof member 10 is mutually diffused and bonded to the guide bar 4 so as to weld thereto in a uniform shape.

Figure 5:
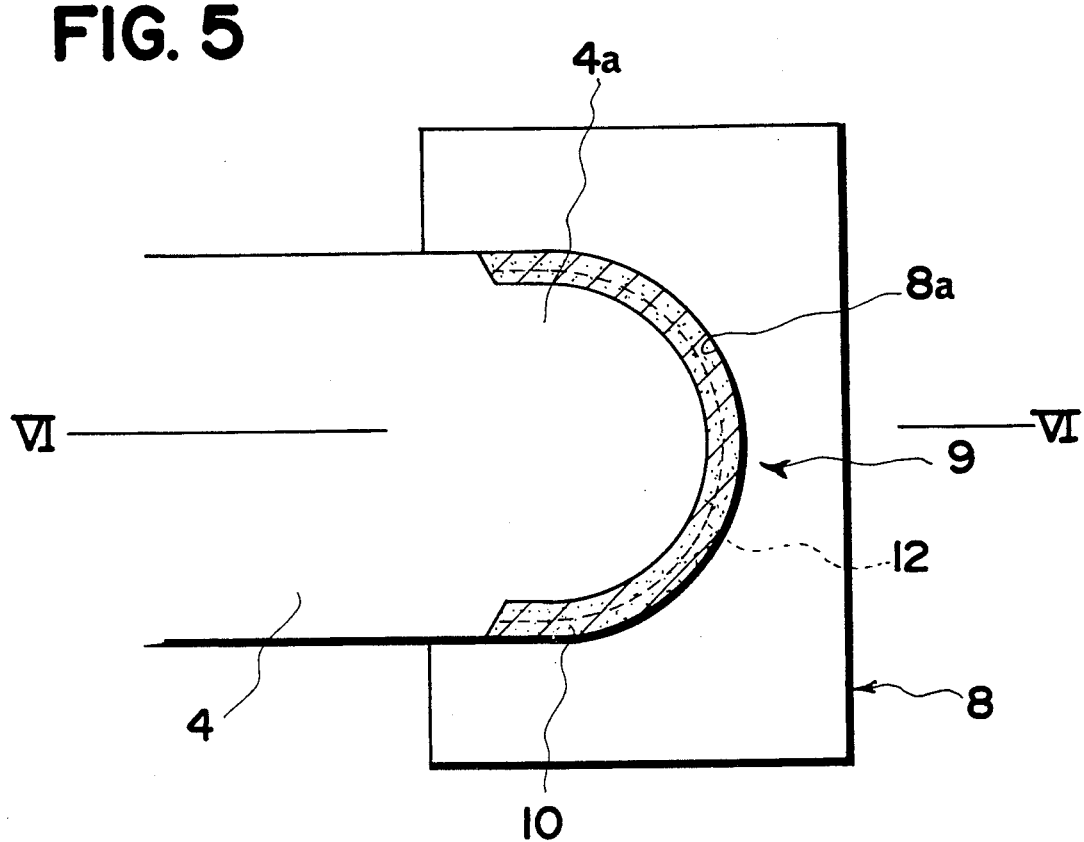
FIG. 5 is a plan view showing a third embodiment.
Figure 6:
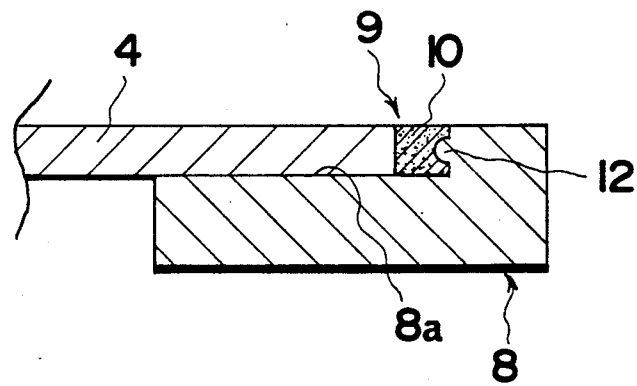
FIG. 6 is a sectioned view on line VI—VI in FIG. 5.
Figure 7:
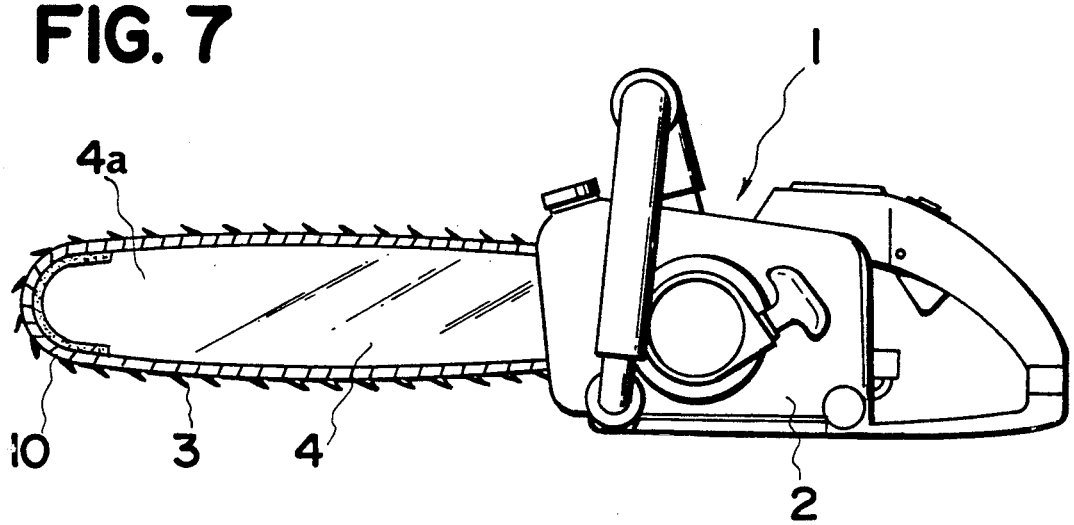
FIG. 7 is a side view of a chain saw.
Figure 8:
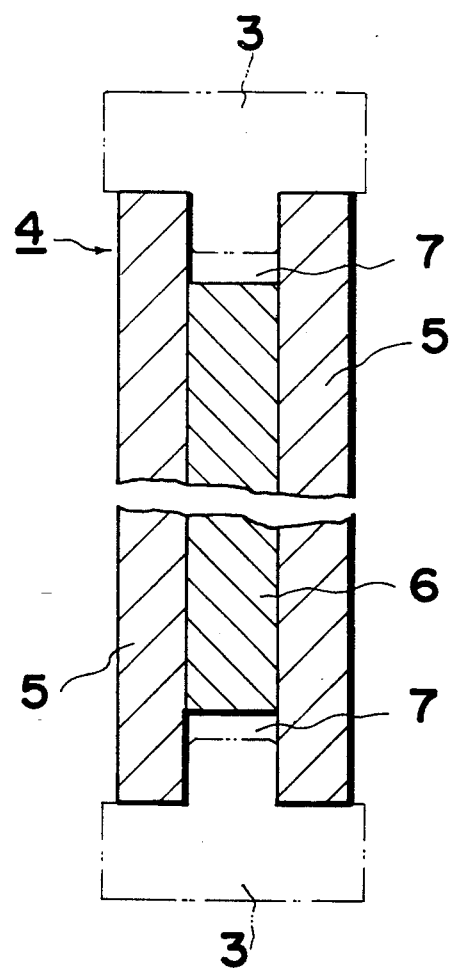
FIG. 8 is a vertically sectioned view showing an example of a chain saw guide bar.
Figure 9:
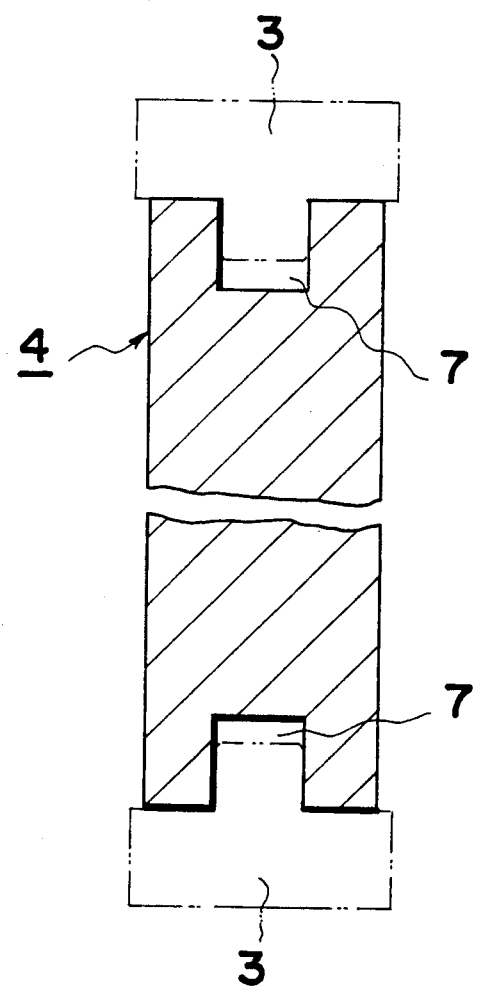
FIG. 9 is a vertically sectioned view showing another example of a chain saw guide bar.

FIGS. 5 and 6 show the third embodiment. In this embodiment, the mold 8 is provided with an arcuate rib 12 in the middle of the peripheral edge of the recess 8a directed toward the guide bar 4. The wear-proof member 10 is welded in the same manner as in the above-mentioned respective embodiments.

As a result, in this latter embodiment a groove is formed on the peripheral edge of the tip 4a to guide a grooving hone so that the grooving work necessary to form the guide groove in the next step may be made easier.

Incidentally, in any of the above-mentioned examples, though not illustrated, the dimension of the space 9 formed between the curved tip 4a and the recess wall 8a is set with consideration of the possible shrinkage of the wear-proof member 10 caused by the sintering step.

According to the present invention, there are obtained the advantageous effect that a chain saw guide bar having a wear-proof member on the curved tip can be easily made without requiring a skilled welding technique. Any finishing operation as by mechanical working or grinding can be made unnecessary. The consumption of the material forming the wear-proof member may be reduced, and thus, the overall cost of the product can be greatly reduced.

What is claimed is:

1. A method of making a chain saw guide bar having an improved wear-resistant tip comprising the steps of providing a guide bar incised in advance to have a predetermined set back at its curved tip, placing said guide bar in a mold having a recess forming a space with the curved tip, filling said space with a member formed of a powdery wear-proof member, and heating said guide bar and wear-proof member to the melting temperature thereof to weld said wear-proof material to the tip of said guide bar.

2. The method according to claim 1, wherein said mold is formed with a rib in opposition to the peripheral edge of said guide bar tip to form a groove in the peripheral edge of said wear-resistant member.

* * * * *